United States Patent [19]

Shinonaga

[11] Patent Number: 5,016,206

[45] Date of Patent: May 14, 1991

[54] UNIQUE WORD DETECTION SYSTEM

[75] Inventor: Hideyuki Shinonaga, Saitama, Japan

[73] Assignee: Kokusai Denshin Denwa Co., Ltd., Tokyo, Japan

[21] Appl. No.: 400,294

[22] Filed: Aug. 29, 1989

[30] Foreign Application Priority Data

Sep. 7, 1988 [JP] Japan ................... 63-222275

[51] Int. Cl.$^5$ ............................. G06F 15/336
[52] U.S. Cl. ..................... 364/715.11; 364/728.03
[58] Field of Search ............... 364/715.11, 728.03; 375/116

[56] References Cited

U.S. PATENT DOCUMENTS

| 4,412,301 | 10/1983 | Strubeck | 364/715.11 |
| 4,498,141 | 2/1985 | Cooper | 364/715.11 |
| 4,510,579 | 4/1985 | Nossen | 364/715.11 |

OTHER PUBLICATIONS

"Unique Word Detection in Digital Burst Communications", IEEE Transactions on Communication Technology, vol. COM—16, No. 4, Aug. 1968, pp. 597–605.
"Phase Ambiguity Resolution in a Four-Phase PSK Communications System", IEEE Transactions on Communication Technology, vol. COM—19, No. 6, Dec. 1971, pp. 1200–1210.

Primary Examiner—David H. Malzahn
Attorney, Agent, or Firm—Armstrong, Nikaido, Marmelstein, Kubovcik & Murray

[57] ABSTRACT

A unique word and/or a recovered phase in the demodulator in a multi-phase modulation system and/or a multi-level modulation system is detected by obtaining a plurality of correlation values, performing linear calculations for those correlation values to provide a correlation pattern, and looking at a table if this pattern coincides with one of the predetermined patterns. The invention is useful even when a received signal quality is poor and/or the length of the unique words is short. A plurality of unique word, together with a recovered phase are also recognized by the present invention.

10 Claims, 16 Drawing Sheets

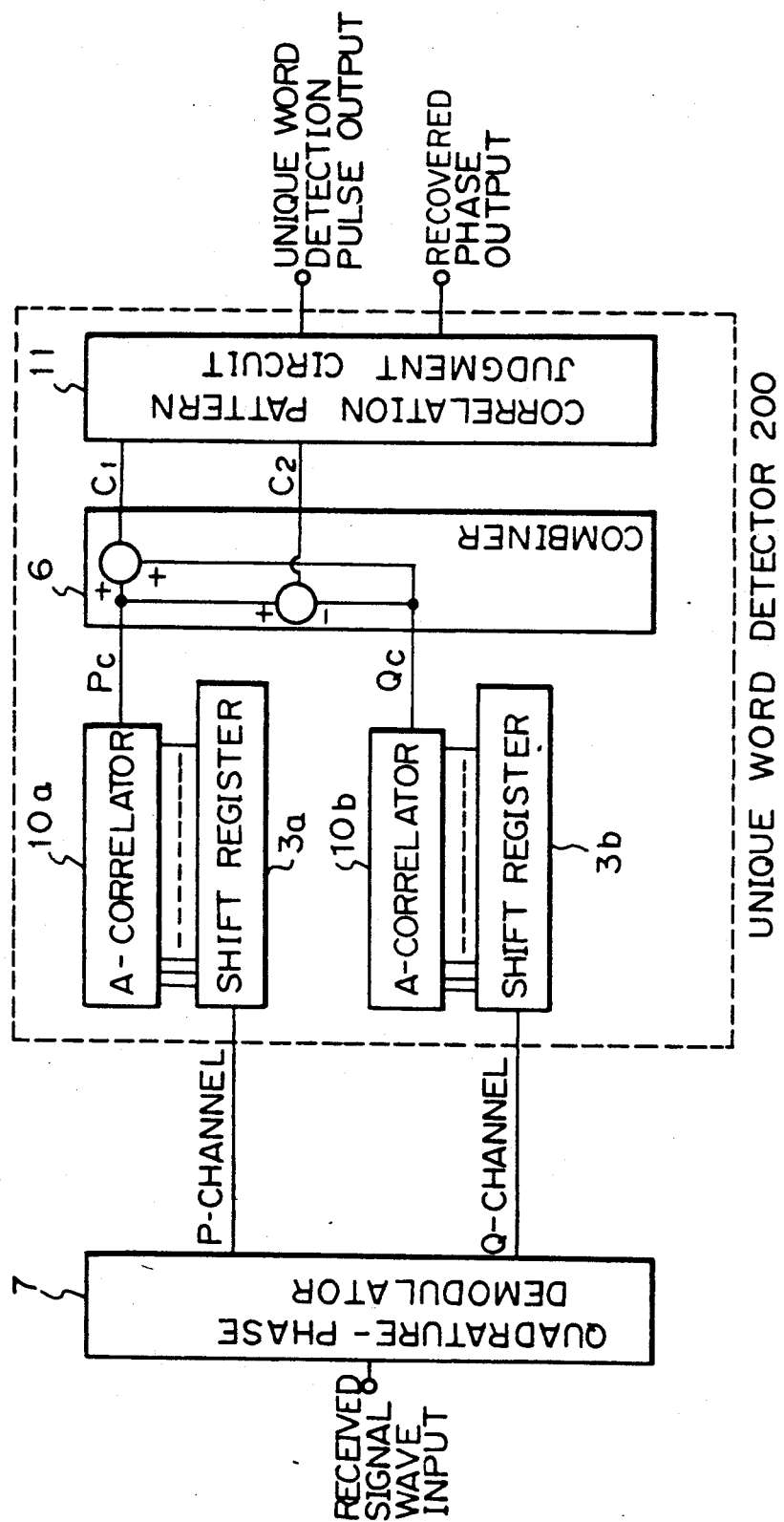

Fig. 1B

| $C_2$ \ $C_1$ | 24 | 22 | ---- | 2 | 0 | -2 | ---- | -22 | -24 |
|---|---|---|---|---|---|---|---|---|---|
| 24 | | | | | 2 | | | | |
| 22 | | | | 2 | | 2 | | | |
| | | | 2 | | 2 | | 2 | | |
| | | | 1 | | | | | | |
| 2 | | 1 | | | | | | 3 | |
| 0 | 1 | | 1 | | | | | | 3 |
| -2 | | 1 | | | | | | 3 | |
| -4 | | | 1 | | | | | | |
| ⋮ | | | | | | | | | |
| -22 | | | | 4 | | 4 | | | |
| -24 | | | | | 4 | | | | |

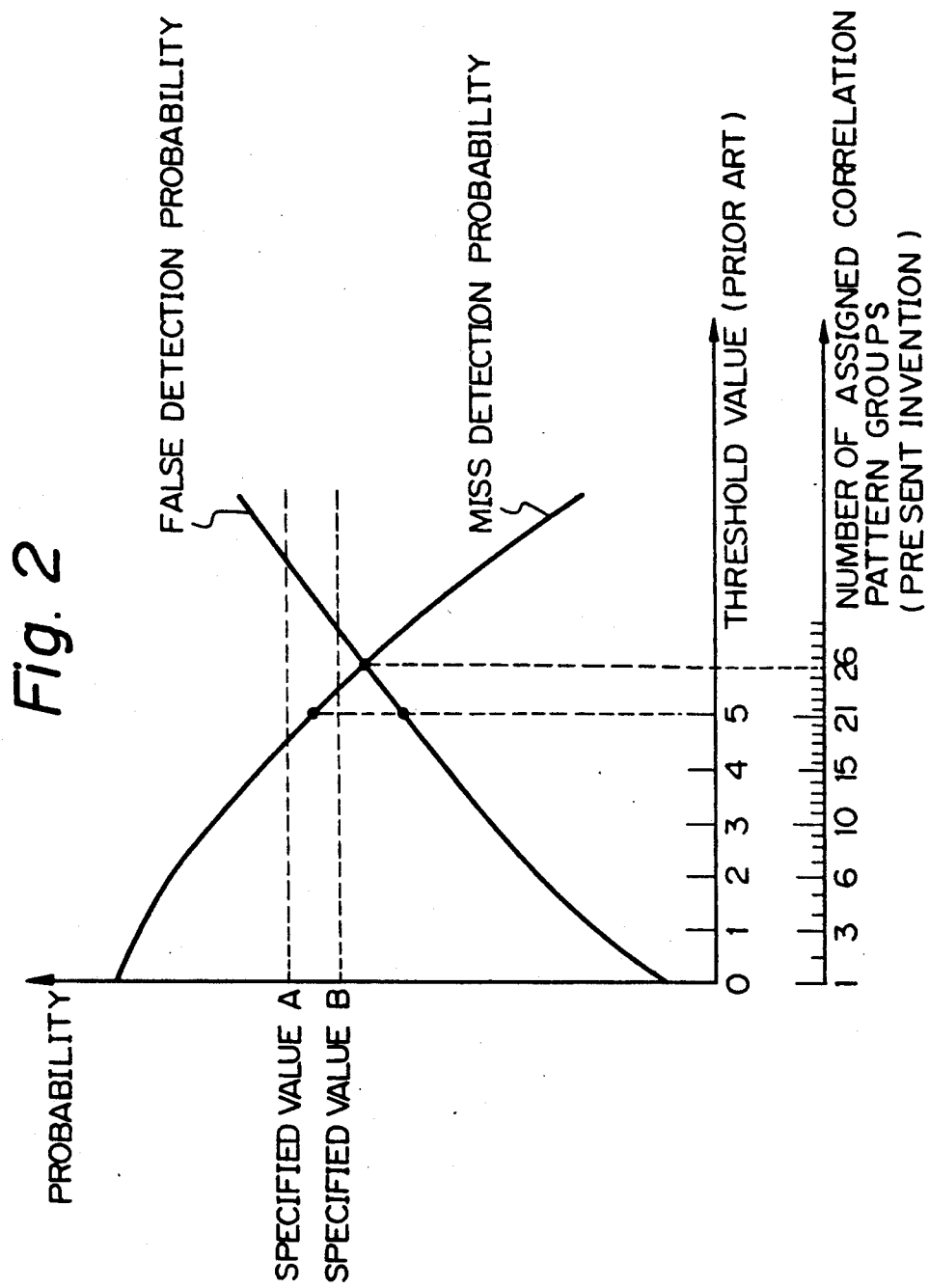

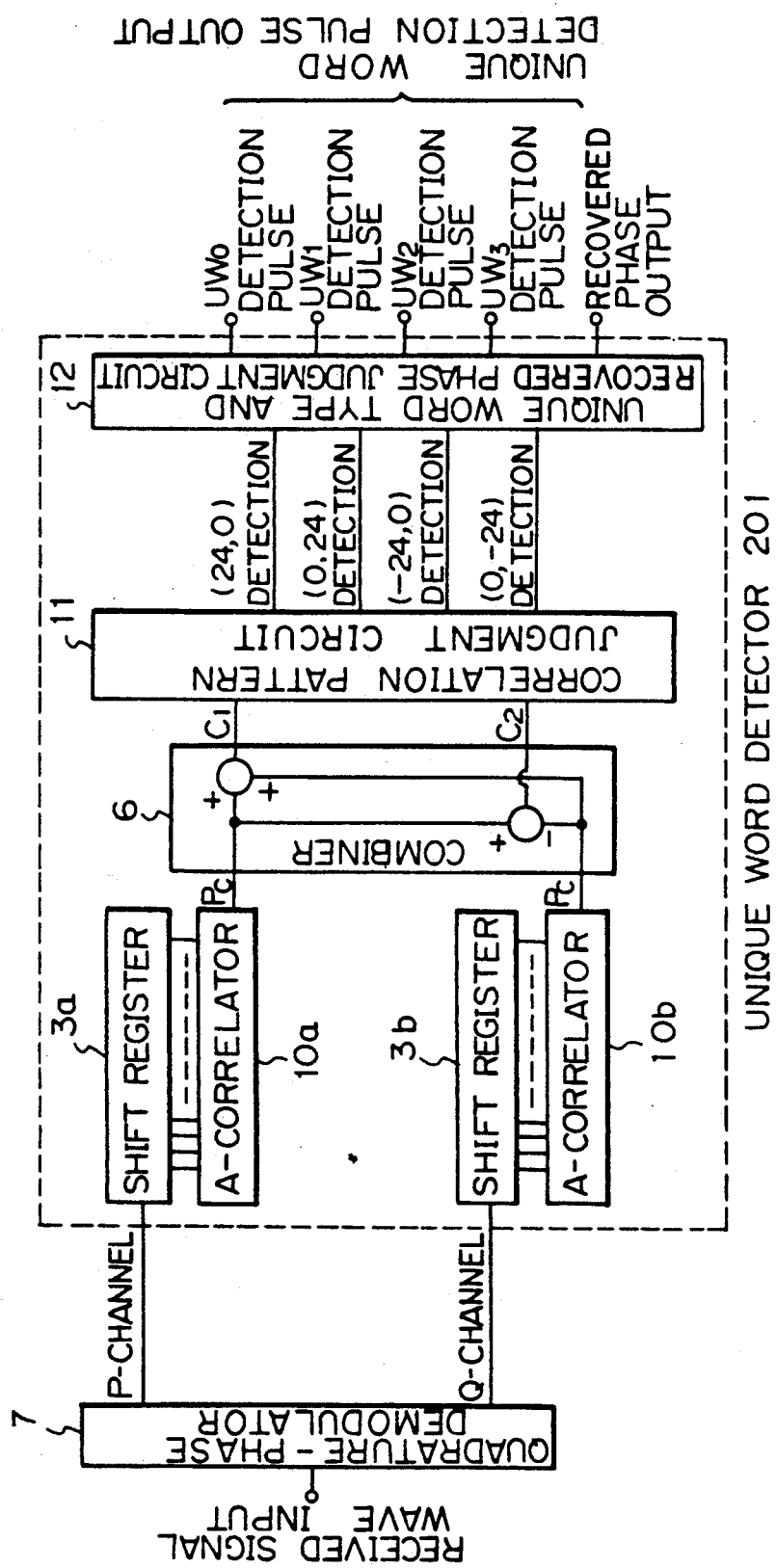

UNIQUE WORD DETECTION SYSTEM

BACKGROUND OF THE INVENTION

The present invention relates to a unique word detecting system in a digital communication system used in a multiphase and/or multilevel modulation system.

A multiphase/multilevel modulation system, such as a quadrature phase shift keying system, an eight-phase phase shift keying system, a sixteen valued QAM (Quadrature Amplitude Modulation) system or a sixty-four-valued QAM system, is used in order to effectively utilize a radio frequency band in a digital communication system. A unique word is widely employed for the purpose of acquisition and maintenance of synchronization, phase ambiguity removal generated by a demodulator, and a signal type recognition and the like in such a digital communication system. In the multiphase or multilevel system, information bits equal to or more than two bits are transmitted in parallel at the same time by one transmission symbol. Accordingly, equal to or more than two bits of the unique word are also transmitted in parallel at the same time by one transmission symbol. When the information bits are transmitted in parallel by L bits per transmission symbol, the number of the bits of the unique word transmitted in parallel is not always L and sometimes is less than L depending on the multiphase/multilevel modulation system. For example, in the case of the quadrature phase shift keying system one transmission symbol transmits two information bits and also two bits of the unique word are transmitted in parallel at the same time by one transmission symbol. On the other hand, in the case of the eight-phase phase shift keying system, while one transmission symbol transmits three information bits, two bits of the unique word are generally transmitted in parallel.

Fig.5 shows the structure of a prior unique word detector employed in a multiphase/multilevel modulation system.

In Fig.5, a reference numeral 1 designates a multiphase or multilevel demodulator, 2 is a parallel/series converter for converting parallel data sequences to a series data sequence, 3 is a shift register, 4 is a correlator and 5 is a threshold judgment circuit. The operation of the unique word detector 100 shown in Fig.5 is briefly described below. A received signal is input to the multiphase/multilevel demodulator 1 and information bits with L bits per transmission symbol are output in parallel. When M bits (M <L) of a unique word are transmitted with one transmission symbol in parallel, these M bits are input to the parallel/series converter 2 to be converted to a series data sequence. At this time, the clock rate is also multiplied by M. Thereafter, the parallel/series-converted data sequence is input to the shift register 3. The shift register 3 is input with a new piece of data at every clock time and shifts the old data to the right bit by bit, resulting in the deletion of the oldest data. The whole data in the shift register 3 which have the same length as the unique word length are input to the correlator 4 in parallel at every clock time and a correlation value with respect to the unique word pattern is computed. When the data in the shift register 3 are $a_0, a_1 ... a_{N-1}$ and the unique word patterns are $u_0, u_1...u_{N-1}$, the correlation value R is computed by $$R = \sum_{i=0}^{N-1} a_i \oplus u_i$$

where $a_i$ and $u_i$ (i=0, 1...N−1) take values 0 or 1, respectively. A symbol $\oplus$ means an exclusive OR, taking the value 0 when $a_i$ and $u_i$ coincide with each other and 1 when they do not. In short, the correlation value R is equal to the number of inconsistent bits in the data of the shift register 3 and the unique word pattern. Such a correlation value is generally called the Hamming distance. The difference between the number of consistent bits and the number of inconsistent bits in the data of the shift register 3 and the unique word pattern is often used as the correlation value. In this case, the correlation value takes either a positive or a negative value. A description will be made hereinafter by using the correlation value that takes the positive or negative value. A difference between the definitions of the two kinds of correlation values is expedient and has no relation with unique word detection characteristics.

The unique word is detected by threshold-judging a correlation value produced at every clock time.

In the unique word detector 100 described above and shown in FIG. 5, however, the clock rate is increased by the parallel/series converter 2 and, as a result, processing in the correlator must be fairly rapidly performed.

In order to solve that problem, a unique word detector 101 whose structure is shown in Fig.6 is widely employed. In FIG. 6, a reference numeral 1 designates a multiphase/multilevel demodulator, 3 (3a–3m) are shift registers, 4 (4a–4m) are correlators, 6 is a combiner and 5 is a threshold judgment circuit. Different from the unique word detector 100 shown in FIG. 5, no parallel/series conversion is conducted, and parallel M bits are input to M numbers of the shift registers 3. In the case of FIG. 6, when the whole unique word length is N bits, the length of each shift register 3 is N/M. The whole data in each shift register 3 are input to the corresponding correlator 4 at every clock time and the correlation value are computed therein. Thereafter, the correlation value for the whole unique word is computed by the combiner 6 and a unique word detection is performed through a threshold judgement by the threshold judgment circuit 5.

For the detailed description of a prior unique word detecting system, the structure of a unique word detector 102 for the quadrature phase shift keying system is illustrated in FIG. 7. It is presumed that the unique word detector also performs the determination of the recovered phase in the demodulator together with the detection of the unique word because phase ambiguity exists in the recovered phase of the quadrature-phase demodulator. In FIG. 7, a reference numeral 7 designates a quadrature demodulator, 3 (3a, 3b) are shift registers, 8 (8a, 8b) are p-correlators, 9 (9a, 9b) are Q-correlators, 6 is a combiner and 5 is a threshold judgment circuit. The received quadrature phase shift keyed signal is input to the quadrature demodulator 7 to be demodulated therein. Two information bits are output in parallel from the quadrature-phase demodulator 7. Since two parallel output sequences are generally called a P-channel and a Q-channel, the two parallel output sequences as shown in FIG .7 will be called the P-channel and Q-channel hereinafter. P-channel and Q-channel data output from the quadrature-phase demodulator 7 are input to the shift registers 3a and 3b, respectively. The whole data in the shift resisters 3 are input to the P-correlators 8 and the Q-correlators 9 at every clock time. The P-correlators 8 and the Q-correlators 9 compute the correlation value with respect to the unique word pattern transmitted in the P-channel and Q-channel, respectively. Thereafter, four correlator outputs are input to the combiner 6. The combiner 6 computes the sum $C_1$ of the P-correlator output of the P-channel and the Q-correlator output of the Q-channel and a difference $C_2$ between the Q-correlator output of the P-channel and the P-correlator output of the Q-channel to give the two computed results $C_1$ and $C_2$ to the threshold judgment circuit 5. The threshold judgment circuit 5 detects the unique word when the absolute value of $C_1$ or $C_2$ exceeds the threshold value, and recognizes the recovered phase in the quadrature-phase demodulator 7 according to the sign of $C_1$ or $C_2$ which exceeds the threshold value.

The operation of the threshold judgment circuit 5 will be described in more detail below. The threshold judgment circuit 5 determines whether the absolute value of $C_1$ or $C_2$ exceeds a single threshold value. A determination can also be possible by setting positive and negative threshold values for $C_1$ and $C_2$. When the absolute value of $C_1$ or $C_2$ is judged to exceed the threshold values, the recovered phase in the quadrature demodulator 7 is determined by which of $C_1$ and $C_2$ exceeds the threshold value, and by whether a polarity is positive or negative. Then a unique word detection pulse and a recovered phase determination result are output. The threshold value is set as to satisfy the specifications for a miss detection probability wherein the unique word can not be detected due to error when the unique word exists and for a false detection probability wherein the unique word is detected in error when no unique word exists. Frequently, the unique word patterns transmitted by the P-channel and Q-channel are designed the same as each other or the P-channel pattern of the unique word is the inverted pattern of the Q-channel unique word bit by bit. In that case, the unique word detector 102 shown in FIG. 7 can be simplified by omitting the Q-correlator 9 as shown in FIG. 8.

In some unique word detectors, not the correlation value resulted from subtracting the number of the inconsistent bits from the number of the consistent bits, but the number of inconsistent bits (the Hamming distance) or the number of the consistent bits is used in the correlator to detect the unique word. Even in such a case, the operation of the threshold judgment circuit 5 is equivalent. Therefore, unique word detection characteristics are the same.

The following problems, however, are present in the conventional systems described above:

The threshold value is so selected that the miss and false detection probabilities are less than the specified values. Generally, when the threshold value is made larger, the miss detection probability is decreased and, conversely, the false detection probability is increased. Accordingly, when the threshold value is T, the miss detection probability is larger than the specified value and the false detection probability is smaller than the corresponding specified value, and when the threshold value is T +ΔT (ΔT: the unit of an increase or a decrease in the threshold value), the miss detection probability is smaller than the specified value, and the false detection probability is larger than the specified value, it is determined that the unique word pattern can not satisfy the specification and the unique word with a longer sequence must be used. As a result, the circuit scales of the unique word detectors 100, 101, 102 or 103 must be enlarged and the transmission efficiency of the digital communication system is decreased.

In the conventional systems, when the number of errors contained in the received unique word pattern becomes large, the unique word can not be detected. For example, in the quadrature phase shift keying system described above, if the whole unique word length is N, and the error of N/4 bits occurs, the absolute values of the outputs $C_1$ and $C_2$ is sometimes equal to each other and, in this case, the detection of the unique word itself is not possible. In that case, the threshold value is designed to be smaller than N/4. When the miss detection probability is larger than the specified value, the unique word with a longer sequence must be used. As a result, the circuit scales of the unique word detectors 100, 101, 102 or 103 must be enlarged and the transmission efficiency of the digital communication is decreased.

SUMMARY OF THE INVENTION

It is an object, therefore, of the present invention to overcome the disadvantages and limitations of a prior unique word detection system by providing a new and improved unique word detection system.

It is also an object of the present invention to provide a unique word detection system in which it is possible to detect a unique word even with poor transmission quality.

It is also an object of the present invention to provide a unique word detection system in which the length of a unique word may be short.

It is also an object of the present invention to provide a unique word detection system in which not only a unique word but also a recovered phase in the demodulator are detected.

It is still another object of the present invention to provide a unique word detection system which detects a plurality of unique words.

The above and other objects are attained by a unique word detection system having; a plurality of correlation device for providing a plurality of correlation values between a plurality of output data output by a demodulator and a predetermined unique word, a linear operation circuit performing linear operations for the correlation values to provide a correlation pattern, and device for determining a unique word and the recovered phase in the demodulator by comparing the correlation pattern with the predetermined correlation patterns to recognize presence of a unique word in a received signal when the correlation pattern coincides with one of the predetermined patterns.

BRIEF DESCRIPTION OF THE DRAWINGS

The foregoing and other objects, features, and attendant advantages of the present invention will be appreciated as the same become better understood by means of the following description and accompanying drawings wherein;

FIG. 1A is a block diagram of the unique word detection system according to the present invention, FIG. 1B shows a table of a read only memory which implements a correlation pattern judgment circuit (11) in FIG. 1A, FIG. 2 shows the relationship among the number of correlation pattern groups to be assigned, and a miss detection probability and a false detection probability in the present invention, FIG. 3 shows a block diagram of another embodiment of the unique word detection system according to the present invention.

DESCRIPTION OF THE PREFERRED EMBODIMENTS

Figure 4A:
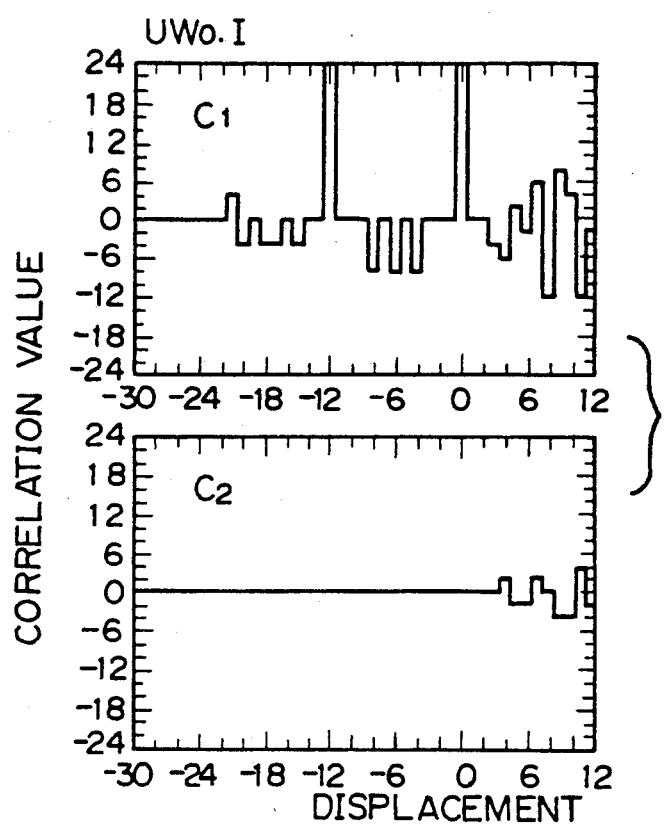
FIGS. 4(a) through 4(p) show two correlation values $C_1$ and $C_2$ when no error exists in a unique word.

An embodiment 1 will be described for the digital communication system using the quadrature phase shift keying system. It is assumed that each unique word pattern transmitted by the P-and Q-channels has 011110001001 of a twelve bit sequence (hereinafter called "A-sequence"). Further, it is assumed that the recovered phase in the quadrature-phase demodulator is also determined.

FIG. 1A shows the first embodiment acccording to the present invention, illustrating the structure of a unique word detector In FIG. 1A, the reference numerals $3_a$ and $3_b$ designate shift registers storing the data of the P-channel and the Q-channel, respectively, 7 is a quadrature-phase demodulator, $10_a$ and $10_b$ are A-correlators for storing the A-sequence and calculating the correlation value between the A-sequence and the data in the shift register 3, 6 is a combiner for combining (linear operations) the outputs of the A-correlators $10_a$ and $10_b$, and 11 is a correlation pattern judgment circuit for detecting the unique word and the recovered phase in the demodulator 7 on the basis of the predetermined correlation patterns.

An operation will be described below. The recovered phase in the quadrature-phase demodulator 7 has four states which are represented by I, II, III and IV. That is, when transmitted P-channel and Q-channel data are (P, Q), respectively, the received P-channel and Q-channel data are one of the four states of I (P, Q), II (Q, $\overline{P}$), III ($\overline{P}$ $\overline{Q}$) and IV ($\overline{Q}$, P), respectively.

The unique word pattern is input to the unique word detector in the form of one of four patterns (A, A), (A, $\overline{A}$), ($\overline{A}$, $\overline{A}$) and ($\overline{A}$, A) depending on the recovered phase in the demodulator 7.

The symbol $\overline{P}$, $\overline{Q}$, or shows the inversed pattern of P, Q, or A. For instance, when A=011110001001, $\overline{A}$=100001110110.

A received quadrature-phase-modulated signal is input to the quadrature-phase demodulator 7 which demodulates the same. The P-channel and Q-channel data output from the quadrature-phase demodulator 7 are input to the shift registers $3_a$ and $3_b$, respectively. The length of each shift register 3 is equal to that of the A-sequence, twelve bits. The shift registers 3 are input with new data and shift the old data to the right at every clock time. The whole data in the shift registers 3 are output to the A-correlators $10_a$ and $10_b$ at every clock time. The A-correlators 10 compute the correlation values ($P_c$, $Q_c$) between the P-channel and Q-channel data input from the shift resisters 3 and the A-sequence stored in the A-correlators 10. Correlation values ($P_c$, $Q_c$) from the two A-correlators 10 are input to the combiner 6, wherein the sum $C_1$ ($=P_c+Q_c$) of and a difference $C_2$ $P_c-Q_c$) between the A-correlator $10_a$ output of the P-channel and the A-correlator $10_b$ output of the Q-channel are computed. Thereafter, the sum $C_1$ and the difference $C_2$ are input to the correlation pattern judgment circuit 11, which is the feature of the present invention. The correlation pattern judgment circuit 11 detects the unique word and determines the recovered phase in the demodulator 7 on the basis of the pattern of the sum $C_1$ and the difference $C_2$. That is, in the present invention, when the pattern of the sume $C_1$ and difference $C_2$ coincides with one of the correlation patterns stored in advance, the unique word is recognized transmission symbol are d in parallel. When M bits and the recovered phase in the demodulator 7 is determined.

The correlation pattern judgment circuit 11, the feature of the present invention, will be described in detail below.

The received unique word generally includes errors due to a noise and the like in a transmission line. The correlation pattern ($C_1$, $C_2$) in a case with no error in the unique word is one of (24, 0), (0, 24), (−24, 0) and (0, −24), which correspond to the recovered phases I, II, III and IV, respectively.

TABLE 1

| number of error bits | correlation pattern | | | | | |
|---|---|---|---|---|---|---|
| 0 | (24, 0) | | | | | |
|   | (0, 24) | | | | | |
|   | (−24, 0) | | | | | |
|   | (0, −24) | | | | | |
| 1 | (22, 2) | (22, −2) | | | | |
|   | (2, 22) | (−2, 22) | | | | |
|   | (−22, −2) | (−22, 2) | | | | |
|   | (−2, −22) | (2, −22) | | | | |
| 2 | (20, 0) | (20, 4) | (20, −4) | | | |
|   | (0, 20) | (4, 20) | (−4, 20) | | | |
|   | (−20, 0) | (−20, −4) | (−20, 4) | | | |
|   | (0, −20) | (−4, −20) | (4, −20) | | | |
| 3 | (18, 2) | (18, −2) | (18, 6) | (18, −6) | | |
|   | (2, 18) | (−2, 18) | (6, 18) | (−6, 18) | | |
|   | (−18, −2) | (−18, 2) | (−18, −6) | (−18, 6) | | |
|   | (−2, −18) | (2, −18) | (−6, −18) | (6, −18) | | |
| 4 | (16, 0) | (16, 4) | (16, −4) | (16, 8) | (16, −8) | |
|   | (0, 16) | (4, 16) | (−4, 16) | (8, 16) | (−8, 16) | |
|   | (−16, 0) | (−16, −4) | (−16, 4) | (−16, −8) | (−16, 8) | |
|   | (0, −16) | (−4, −16) | (4, −16) | (−8, −16) | (8, −16) | |
| 5 | (14, 2) | (14, −2) | (14, 6) | (14, −6) | (14, 10) | (14, −10) |
|   | (2, 14) | (−2, 14) | (6, 14) | (−6, 14) | (10, 14) | (−10, 14) |
|   | (−14, −2) | (−14, 2) | (−14, −6) | (−14, 6) | (−14, −10) | (−14, 10) |
|   | (−2, −14) | (2, −14) | (−6, −14) | (6, −14) | (−10, −14) | (10, −14) |

TABLE 1-continued

| number of error bits | correlation pattern | | | | | | |
|---|---|---|---|---|---|---|---|
| 6 | (12, 0) | (12, 4) | (12, −4) | (12, 8) | (12, −8) | (12, 12) | (12, −12) |
|  | (0, 12) | (4, 12) | (−4, 12) | (8, 12) | (−8, 12) | (12, 12) | (−12, 12) |
|  | (−12, 0) | (−12, −4) | (−12, 4) | (−12, −8) | (−12, 8) | (−12, −12) | (−12, 12) |
|  | (0, −12) | (−4, −12) | (4, −12) | (−8, −12) | (8, −12) | (−12, −12) | (12, −12) |

When errors are included in the unique word, the correlation pattern changes. Table 1 shows the correlation patterns ($C_1$, $C_2$) when error bits equal to or less than 6 are included in the unique word.

In Table 1, the correlation pattern groups for each number of errors have four rows, and the first, second, third and fourth rows correspond to the correlation patterns (24, 0), (0, 24), (−24, 0) and (0, −24), respectively, when errors are not contained. As is obvious from Table 1, while the four kinds of the correlation patterns (24, 0), (0, 24), (−24, 0) and (0, −24) have a relationship that $C_1$ and $C_2$ are interchanged and/or a sign is inversed. When errors are included, the same relationship as above is maintained among the correlation patterns. In short, when the correlation pattern (a, b) exists, correlation patterns (b, a), (−a, −b) and (−b, −a) also exist.

No same correlation pattern exists when the number of the error bits is equal to or smaller than five. However, each of the correlation patterns (12, 12), (12, −12), (−12, −12) and (−12, 12) is appeared twice when the number of the error bits is six as enclosed by the dotted line in the Table 1. Therefore, when one of four kinds of correlation patterns in said dotted line area is detected, it is impossible to determine which one of the four basic correlation patterns (24, 0), (0, 24), (−24, 0) and (0, −24) the received pattern corresponds to, and therefore the received phase can't be determined. The reason why the unique word including six error bits can't be detected in the conventional unique word detecting systems is that the absolute values of $C_1$ and $C_2$ becomes equal to each other as described above on rare occasions.

In the unique word detection system according to the present invention, the correlation patterns from which the correlation pattern with no error can not be solely determined are removed and appropriate number of correlation pattern groups are selected out of the remaining, and the correlation pattern ($C_1$, $C_2$) is compared with the selected (or assigned) pattern groups to see if the same pattern exists.

That is, the correlation pattern judgment circuit 11 judges that the unique word is detected when one of the assigned correlation patterns is detected and the received phase is judged which one of the basic patterns (24, 0), (0, 24), (−24, 0) and (0, −24) the detected correlation pattern corresponds to.

It should be noted in the Table 1 that even if the number of error bits is six, the probability that the pattern is the same as that enclosed by the dotted line is rather small. And, when the pattern does not coincide with that in the dotted line, the unique word is detected even when there are six error bits.

The correlation pattern judgment circuit 11 may be implemented by a memory table. That memory table may be a read only memory.

FIG. 1B shows an example of that table, in which the horizontal line shows the address $C_1$ (24,22,20, ..., −22,−24), and the vertical line shows the address $C_2$ (24,22,20,..., −22,−24). It should be noted that only the even number addresses for $C_1$ and $C_2$ are enough, since those numbers take only even number in the embodiment.

In the Table 1, the pattern (24,0) means the received phase I. Therefore, in the table in FIG. 1B, the number 1 is stored in the address ($C_1$=24, $C_2$=0). Similarly, in the table 1 in FIG. 1B, the address ($C_1$=0, $C_2$=24) stores 2, the address (−24,0) stores 3, and the address ($C_1$=0, $C_2$=−24) stores 4. Similarly, the address ($C_1$=22, $C_2$=2) stores 1, ($C_1$=22,$C_2$=−2) stores 1, ($C_1$=2,$C_2$=22) stores 2, ($C_1$=−22, $C_2$=−2) stores 3, and ($C_1$=−2, $C_2$=−22) stores 4.

All the addresses which are not defined by the Table 1 stores 0 in the table shown in FIG. 1B.

In the above structure of the correlation pattern judgment circuit, when the pattern ($C_1$, $C_2$) is applied to the table of FIG. 1B as the address of the same, the table provides 0, 1, 2, 3 or 4 as an output signal. When the output signal of the table is 0, it means that no unique word is detected. On the other hand, when the output signal is 1, 2, 3 or 4, it means that the unique word is detected, and the received phase is given by the output of the table.

It should be noted of course that the addresses ($C_1$=12, $C_2$=12), ($C_1$=12, $C_2$=−12) et al in the memory table store of course 0.

It should be appreciated in the above explanation that the feature of the present invention is the use of the comparison of the correlation pattern ($C_1$, $C_2$) with predetermined correlation patterns to detect the presence of the unique word, together with the received phase. A prior art does not compare the pattern, but tests if the absolute value of the correlation values $C_1$ or $C_2$ exceeds the threshold value, and determines the received phase according to the sign and the type of the correlation value $C_1$ or $C_2$ which exceeds the threshold value.

FIG. 2 is a characteristic diagram showing relationship among the number of predetermined correlation pattern groups to be assigned, and the miss detection probability and the false detection probability, together with the same relationship as above wherein the conventional threshold values are employed.

As is obvious from FIG. 2, the miss detection probability and the false detection probability can be flexibly adjusted by increasing or decreasing the number of predetermined correlation pattern groups in the Table 1. On the other hand, in the conventional system, when the threshold value is increased or decreased by one, the miss detection probability and the false detection probability change largely and a fine adjustment is difficult.

For example, in the conventional system in FIG. 2, when the specification for the miss detection probability and the false detection probability takes the value A, the threshold value 5 can satisfy the specification. However, when the specification takes the value B, the miss detection probability can not satisfy the specification, if the threshold value is 5, and therefore, the unique word of the longer sequence must be used in order to meet the specified value B.

On the other hand, in the unique word detector 200 according to the present invention, the specification can be sufficiently satisfied when 26 correlation pattern groups are assigned. It should be appreciated in the Table 1 that the number of the correlation pattern groups is 26, which excludes those in the dotted line. The number of correlation pattern groups for the errors 0, 1, 2, 3, 4, 5 and 6 are 1, 2, 3, 4, 5, 6, and 15. And, $1+2+3+4+5+6+5=26$.

As described above, according to the present invention, the miss detection probability and the false detection probability can be finely controlled as compared with the conventional system and the unique word including many errors unable to be detected by the conventional system can be detected.

Even when the correlation value is detected by detecting the number of the inconsistent bits (the Hamming distance) or of the consistent bits, only the values of the correlation patterns are different and the present invention is applicable in the same manner. The unique word detection characteristics in that case are of course the same as that of FIG. 2. Further, it can be seen that the unique word detection system according to the present invention can be implemented only by replacing the conventional threshold judgment circuit 5 with the correlation pattern judgment circuit 11. Therefore, an increase in the circuit scale due to the use of the unique word detecing system according to the present invention is small.

The embodiment 1 is the fundamental detection system according to the present invention, and the type of the unique words is not judged but the received phase in the demodulator 7 is judged. The unique word detecting system wherein both the type of the unique word and the received phase are judged will be described below.

(EMBODIMENT 2)

The unique word detection system according to the present invention will be described below by exemplifying the unique words employed in an INTELSAT TDMA (Time Division Multiplexing Access) system using the quadrature phase shift keying system.

In the INTELSAT TDMA system, four types of second unique words $UW_0$, $UW_1$, $UW_2$ and $UW_3$ mentioned below are employed.

The second unique word consists of two first unique words (for example, P-channel A and Q-channel A, P-chnnel A and Q-channel $\bar{A}$ et al) which are 24 bits partial patterns of first unique words.

| | | |
|---|---|---|
| $UW_0$ | P channel AA | |
| | Q channel AA | |
| $UW_1$ | P channel AA | |
| | Q channel A$\bar{A}$ | |
| $UW_2$ | P channel A$\bar{A}$ | |
| | Q channel A$\bar{A}$ | |
| $UW_3$ | P channel A$\bar{A}$ | |
| | Q channel AA | | where A represents a 12 bit sequence 011110001001 as the same as in the embodiment 1 and $\bar{A}$ represents a pattern wherein 1 and 0 are inverted in the A-sequence ($\bar{A}=100001110110$). Thus, each unique word is constituted by employing four A or $\bar{A}$-sequences. The detection of the unique word is performed such that first 24 bits partial patterns and second 24 bits partial patterns are detected separately and, only when both the parts are detected, the unique word is judged to be detected.

Since four kind of the received phases (I, II, III, IV) exist as described with reference to the embodiment 1, four types of the unique words $UW_0-UW_3$, the feature of the embodiment 2, totally have sixteen unique word patterns mentioned below. The unique word pattern is named by the type of the unique word and the received phase. Preceding the unique word, a bit timing recovery sequence (hereinafter called "BTR") with a 0101...01 pattern (alternate 1 and 0 pattern) is added in the INTELSAT TDMA system. The bit timing recovery sequence affecting the correlation value is represented by the BTR which is included in the sixteen unique word patterns. The symbol $\overline{BTR}$ designate a pattern wherein 0 and 1 are inverted in the BTR sequence. There are the following sixteen kinds of the unique word patterns:

| | | | | |
|---|---|---|---|---|
| (1) | $UW_0$, I | P-channel BTR | A | A |
| | | Q-channel BTR | A | A |
| (2) | $UW_0$, II | P-channel BTR | A | A |
| | | Q-channel $\overline{BTR}$ | $\bar{A}$ | $\bar{A}$ |
| (3) | $UW_0$, III | P-channel $\overline{BTR}$ | $\bar{A}$ | $\bar{A}$ |
| | | Q-channel $\overline{BTR}$ | $\bar{A}$ | $\bar{A}$ |
| (4) | $UW_0$, IV | P-channel $\overline{BTR}$ | $\bar{A}$ | $\bar{A}$ |
| | | Q-channel BTR | A | $\underline{A}$ |
| (5) | $UW_1$, I | P-channel BTR | A | $\bar{A}$ |
| | | Q-channel BTR | A | A |
| (6) | $UW_1$, II | P-channel BTR | A | A |
| | | Q-channel $\overline{BTR}$ | $\bar{A}$ | A |
| (7) | $UW_1$, III | P-channel $\overline{BTR}$ | $\bar{A}$ | A |
| | | Q-channel $\overline{BTR}$ | $\bar{A}$ | $\bar{A}$ |
| (8) | $UW_1$, IV | P-channel $\overline{BTR}$ | $\bar{A}$ | $\bar{A}$ |
| | | Q-channel BTR | A | $\bar{A}$ |
| (9) | $UW_2$, I | P-channel BTR | A | $\underline{A}$ |
| | | Q-channel BTR | A | $\underline{A}$ |
| (10) | $UW_2$, II | P-channel BTR | A | A |
| | | Q-channel $\overline{BTR}$ | $\bar{A}$ | $\bar{A}$ |
| (11) | $UW_2$, III | P-channel $\overline{BTR}$ | $\bar{A}$ | $\bar{A}$ |
| | | Q-channel $\overline{BTR}$ | $\bar{A}$ | A |
| (12) | $UW_2$, IV | P-channel $\overline{BTR}$ | $\bar{A}$ | A |
| | | Q-channel BTR | A | $\underline{A}$ |
| (13) | $UW_3$, I | P-channel BTR | A | $\underline{A}$ |
| | | Q-channel BTR | A | $\underline{A}$ |
| (14) | $UW_3$, II | P-channel BTR | A | $\bar{A}$ |
| | | Q-channel $\overline{BTR}$ | $\bar{A}$ | A |
| (15) | $UW_3$, III | P-channel $\overline{BTR}$ | $\bar{A}$ | A |

|      |          | Q-channel $\overline{BTR}$ | $\overline{A}$ | A |
|------|----------|---------|---|---|
| (16) | $UW_3$, IV | P-channel $\overline{BTR}$ | $\overline{A}$ | A |
|      |          | Q-channel BTR | A | $\overline{A}$ |

The unique word detector finally detects one of above sixteen unique word patterns.

FIG. 3 shows the structure of a unique word detector 201, a second embodiment according to the present invention. In FIG. 3, a difference from the embodiment 1 (shown in FIG. 1) is the presence of a unique word type and received phase judgment circuit 12 for judging above-mentioned sixteen unique word patterns by the present output and the output twelve clock time before of the correlation pattern judgment circuit 11. An operation will be described below for the difference from the embodiment 1.

The correlation pattern judgment circuit 11, as with the case of the embodiment 1, detects the correlation pattern and judges to which of (24, 0), (0, 24), (−24, 0) and (0, −24) the detected correlation pattern corresponds, if there were no error. The judged result is fed to the unique word type and received phase judgment circuit 12. The unique word type and received phase judgment circuit 12 refers to the judged result of twelve clock time before. When the correlation pattern corresponding to any of (24, 0), (0, 24), (−24, 0) and (0, −24) was also detected twelve clock time before, the type of the unique word and the received phase are judged by Table 2 shown later and a unique word detection pulse and a received phase judgment result are outputted.

Figure 4B:
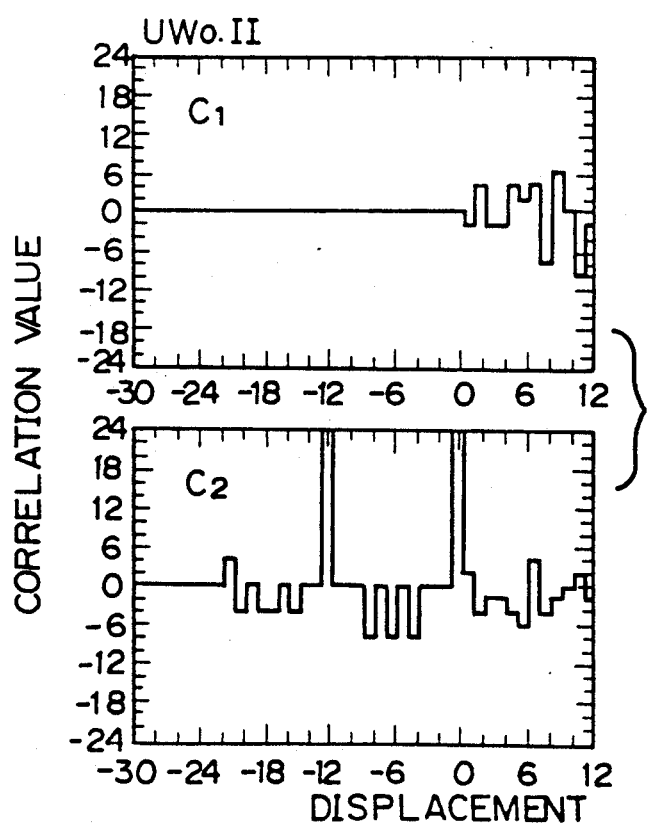
Figure 4C:
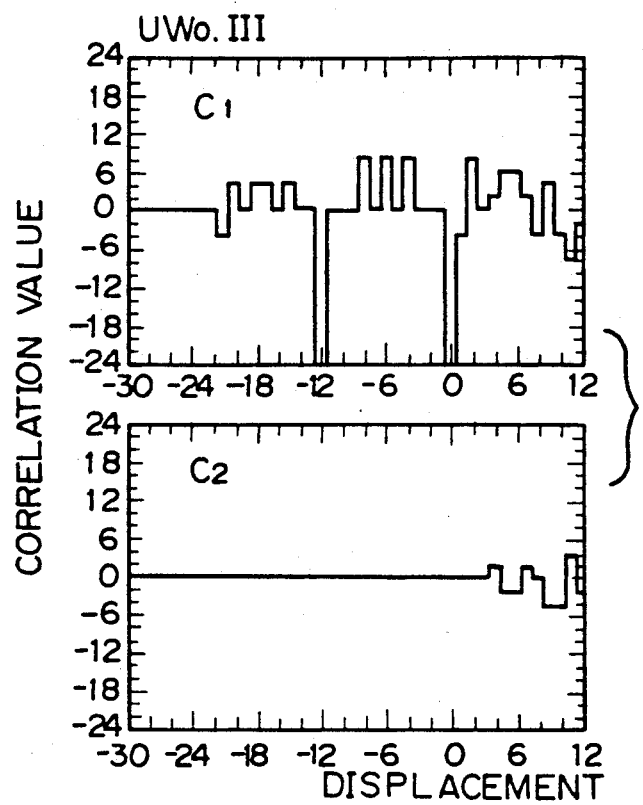
Figure 4D:
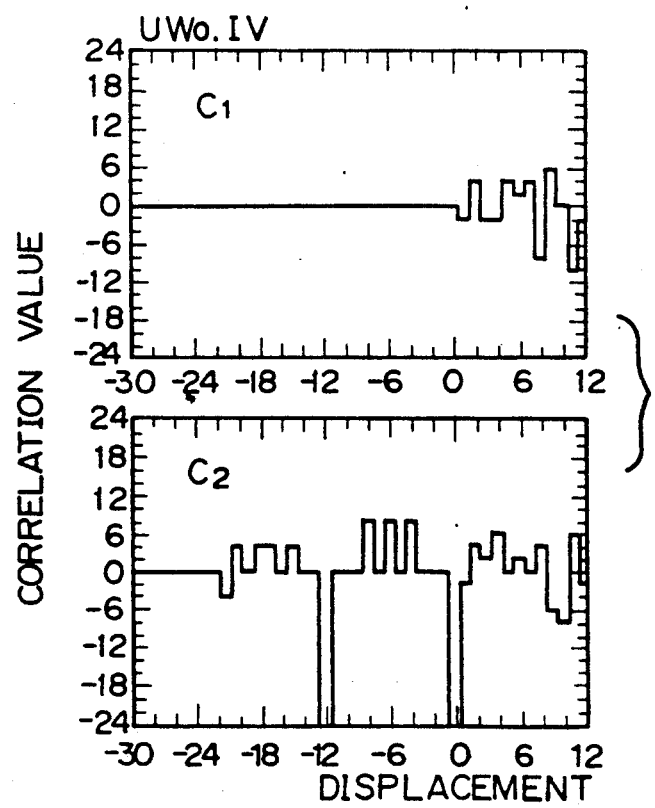
Figure 4E:
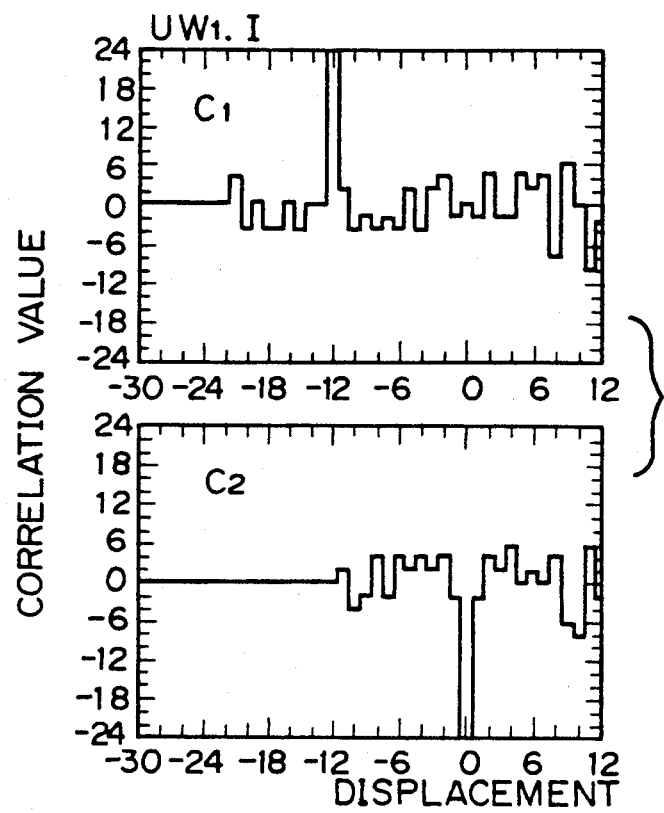
Figure 4F:
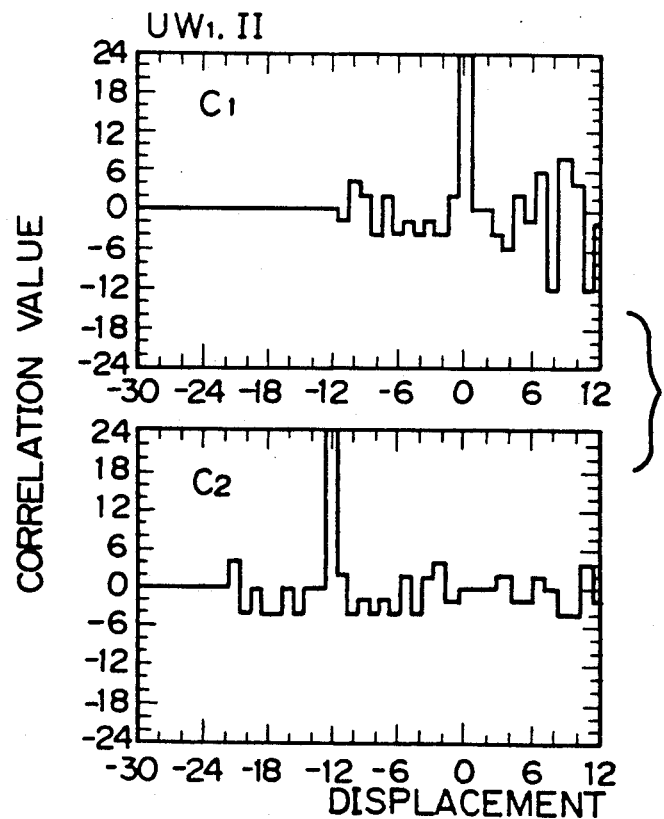
Figure 4G:
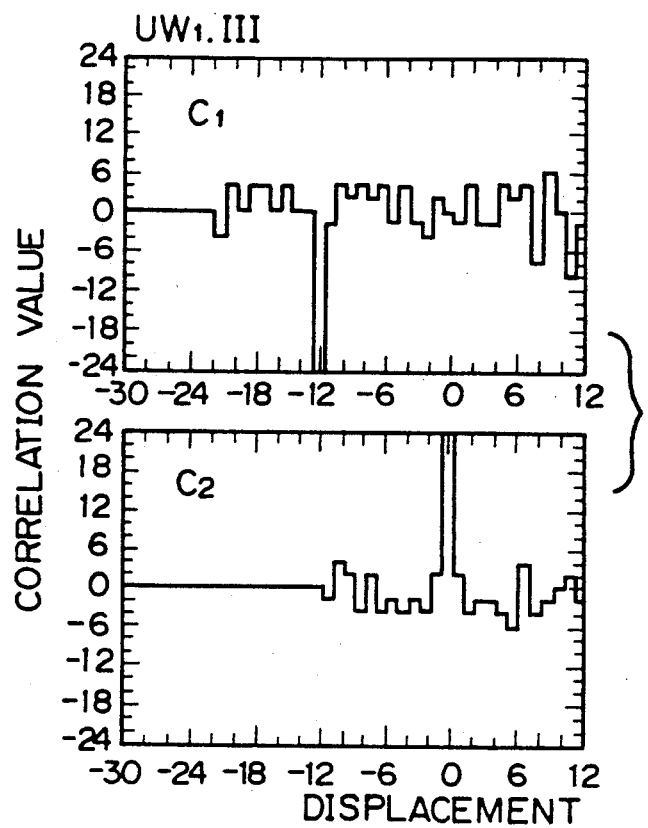
Figure 4H:
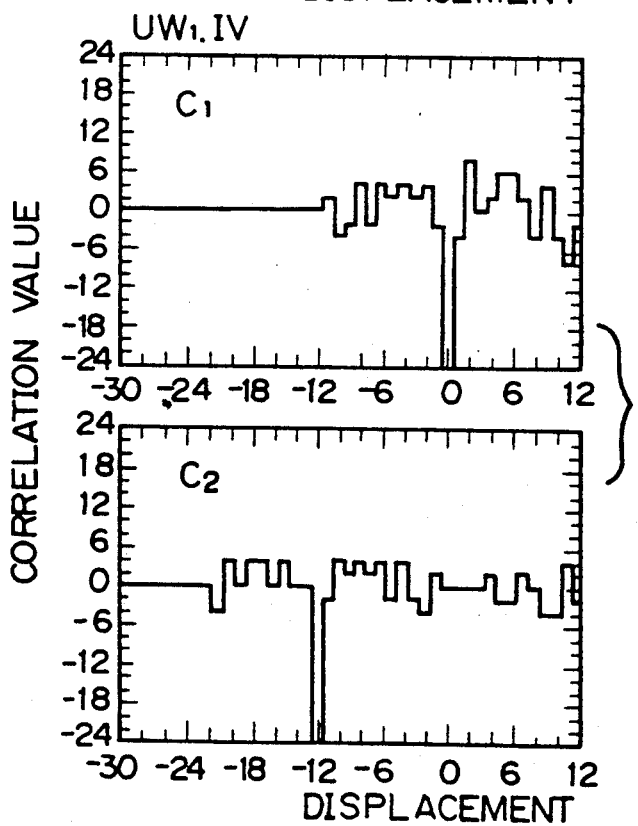
Figure 4I:
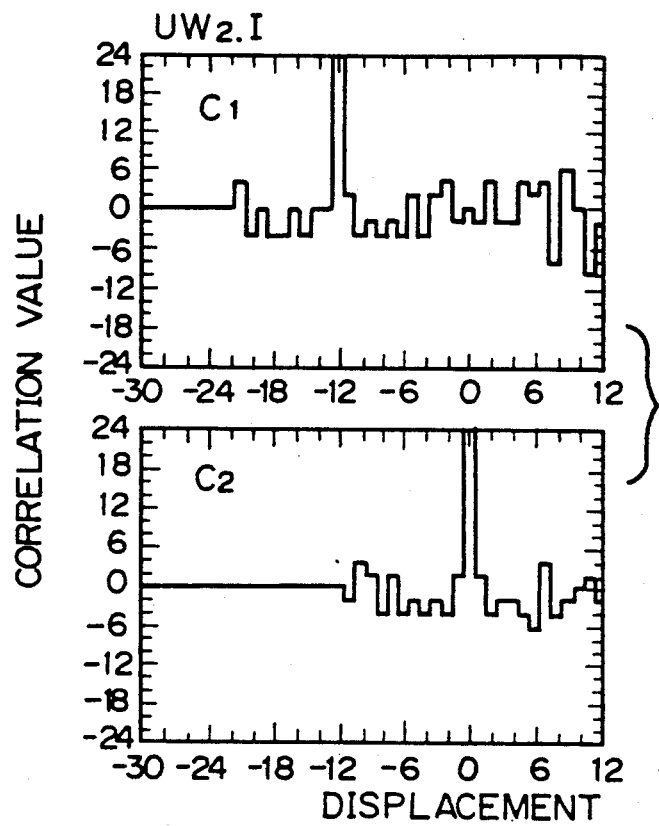
Figure 4J:
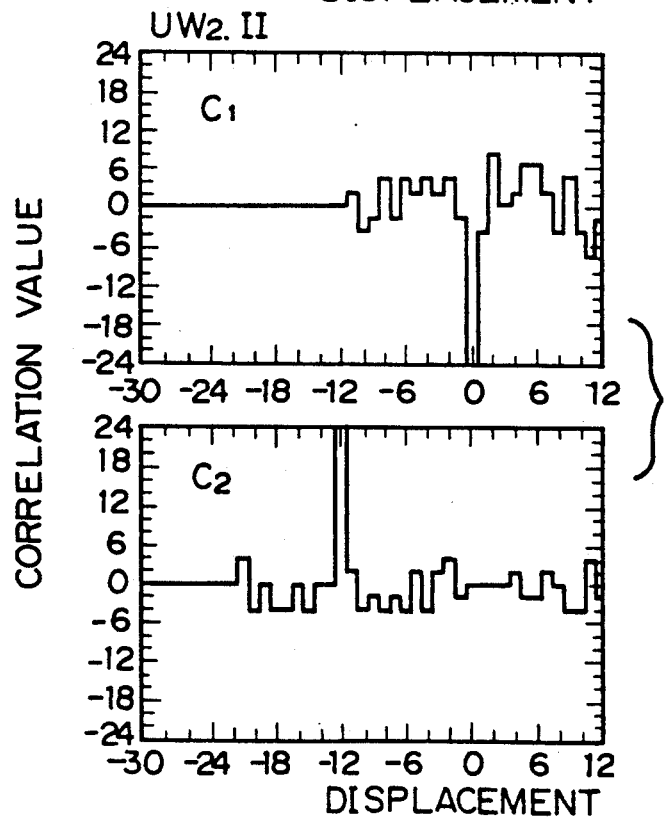
Figure 4K:
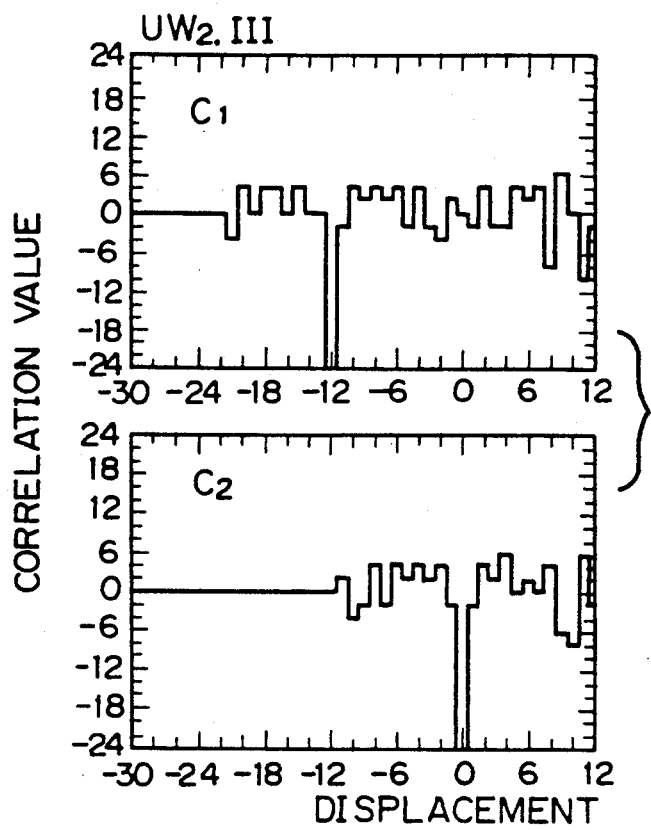
Figure 4L:
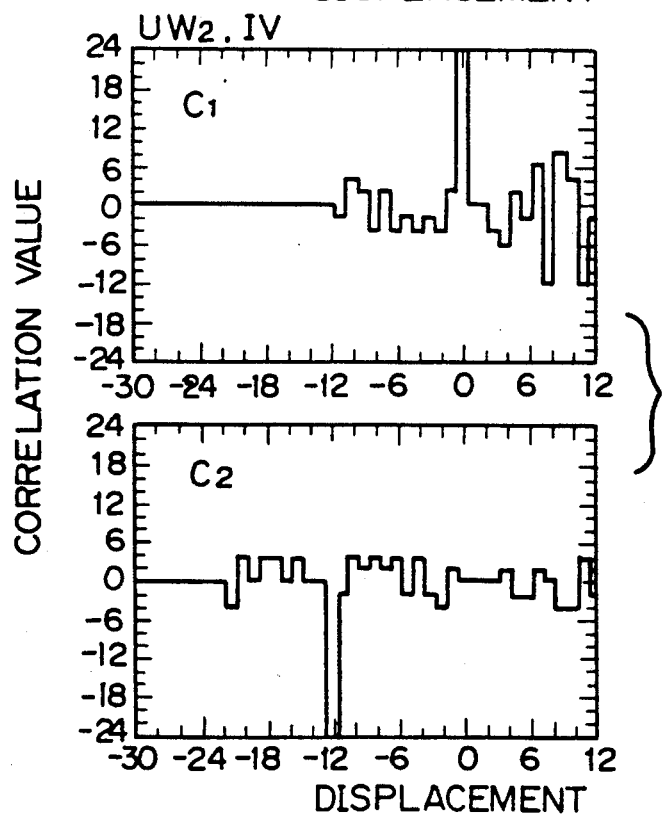
Figure 4M:
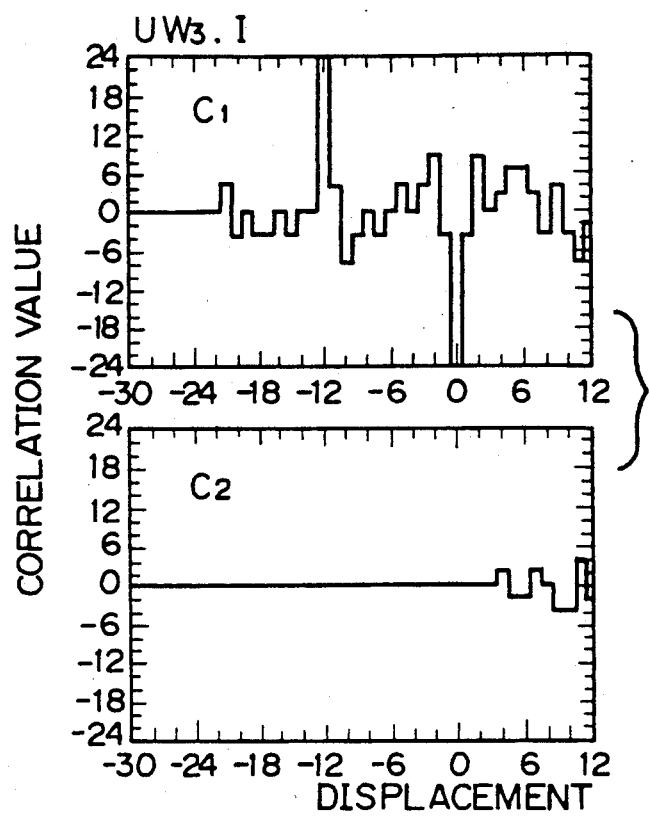
Figure 4N:
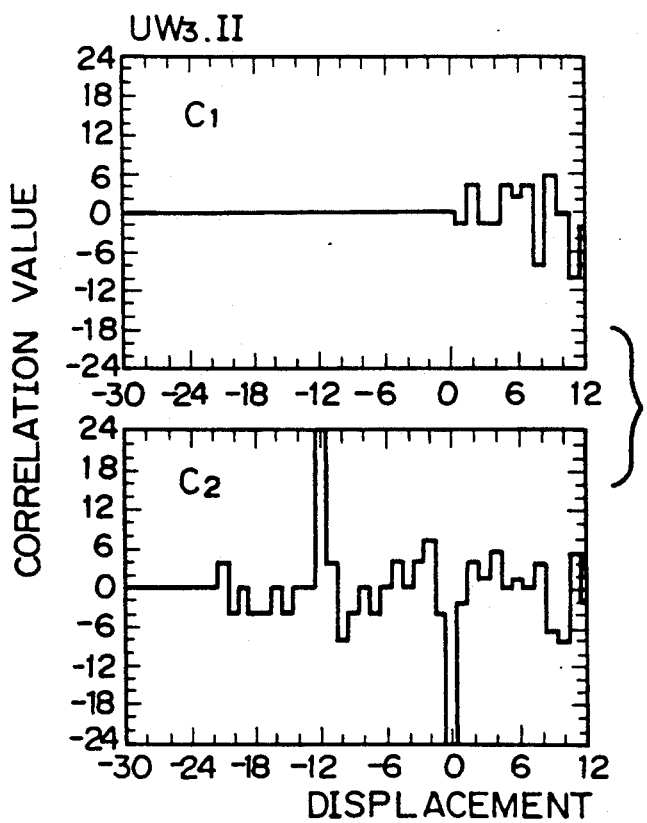
Figure 4O:
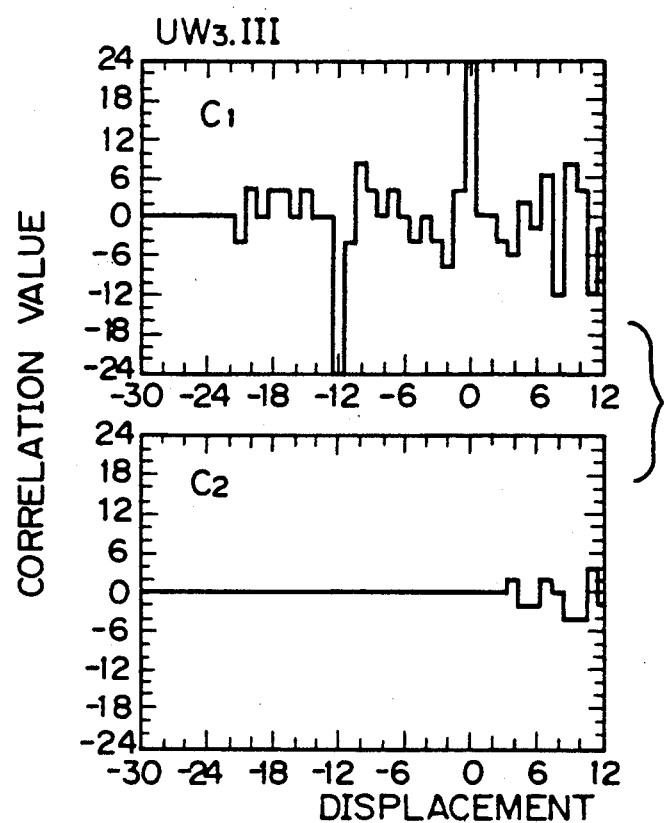
Figure 4P:
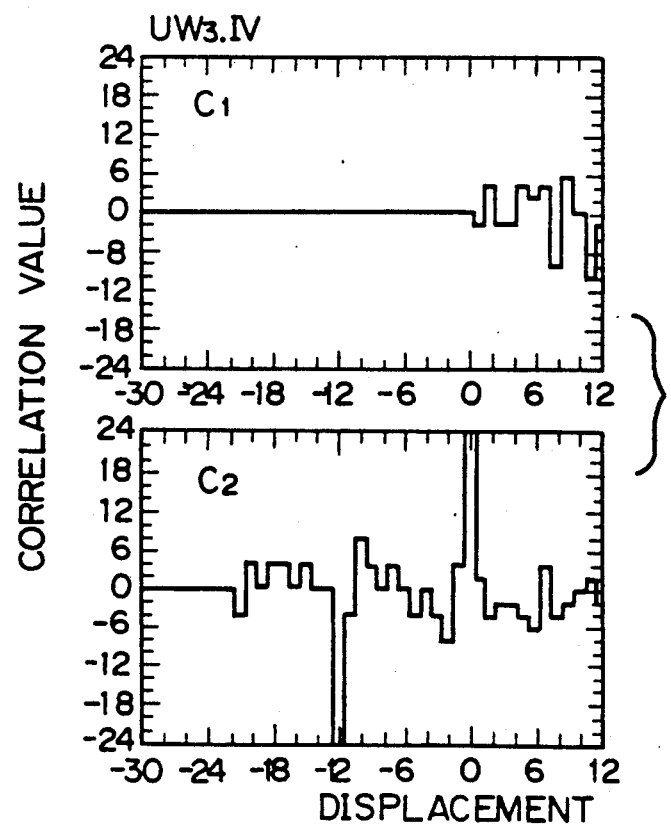
Figure 5:
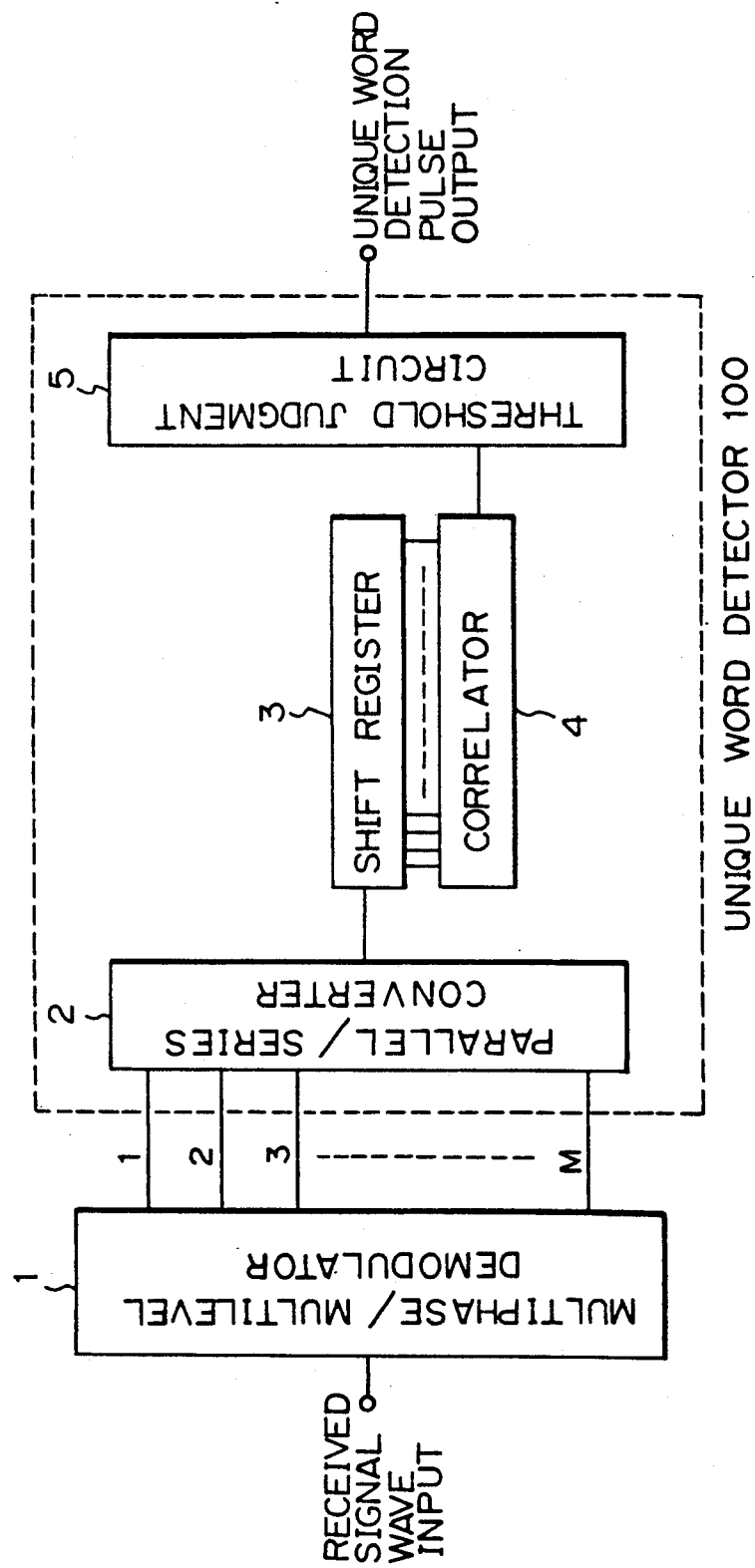
FIG. 5, FIG. 6, FIG. 7, and FIG. 8 are block diagrams of prior arts.
Figure 6:
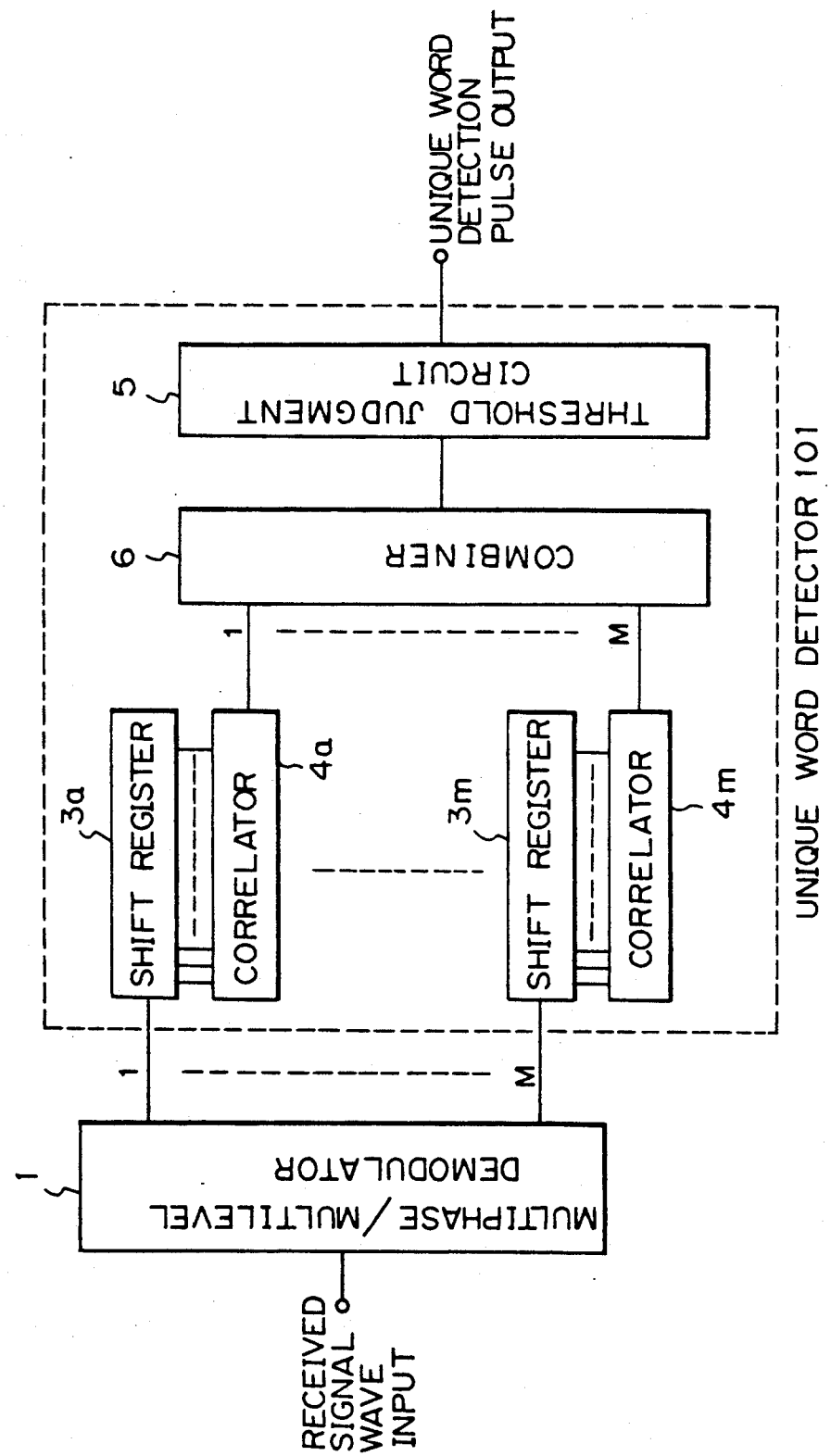
Figure 7:
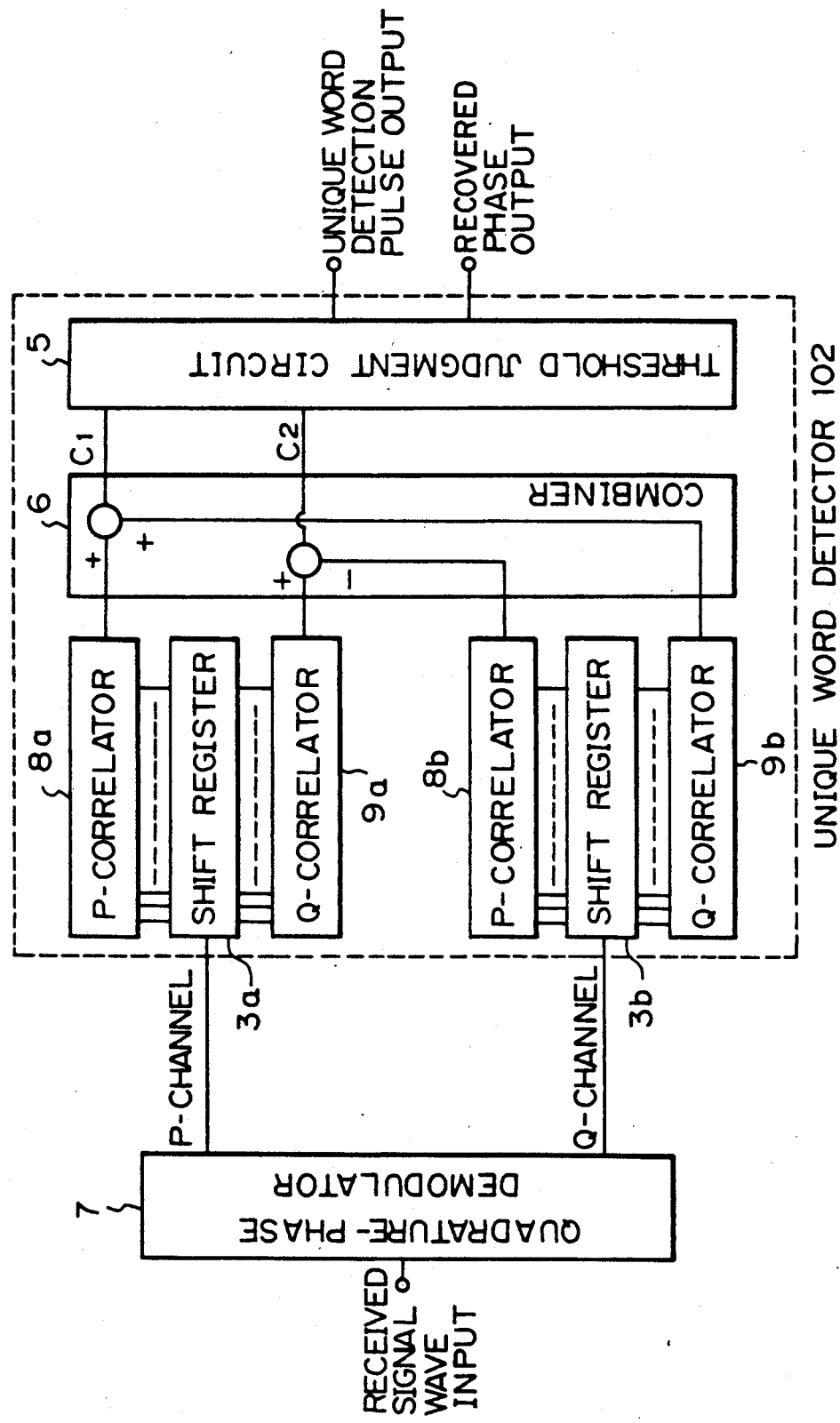
Figure 8:
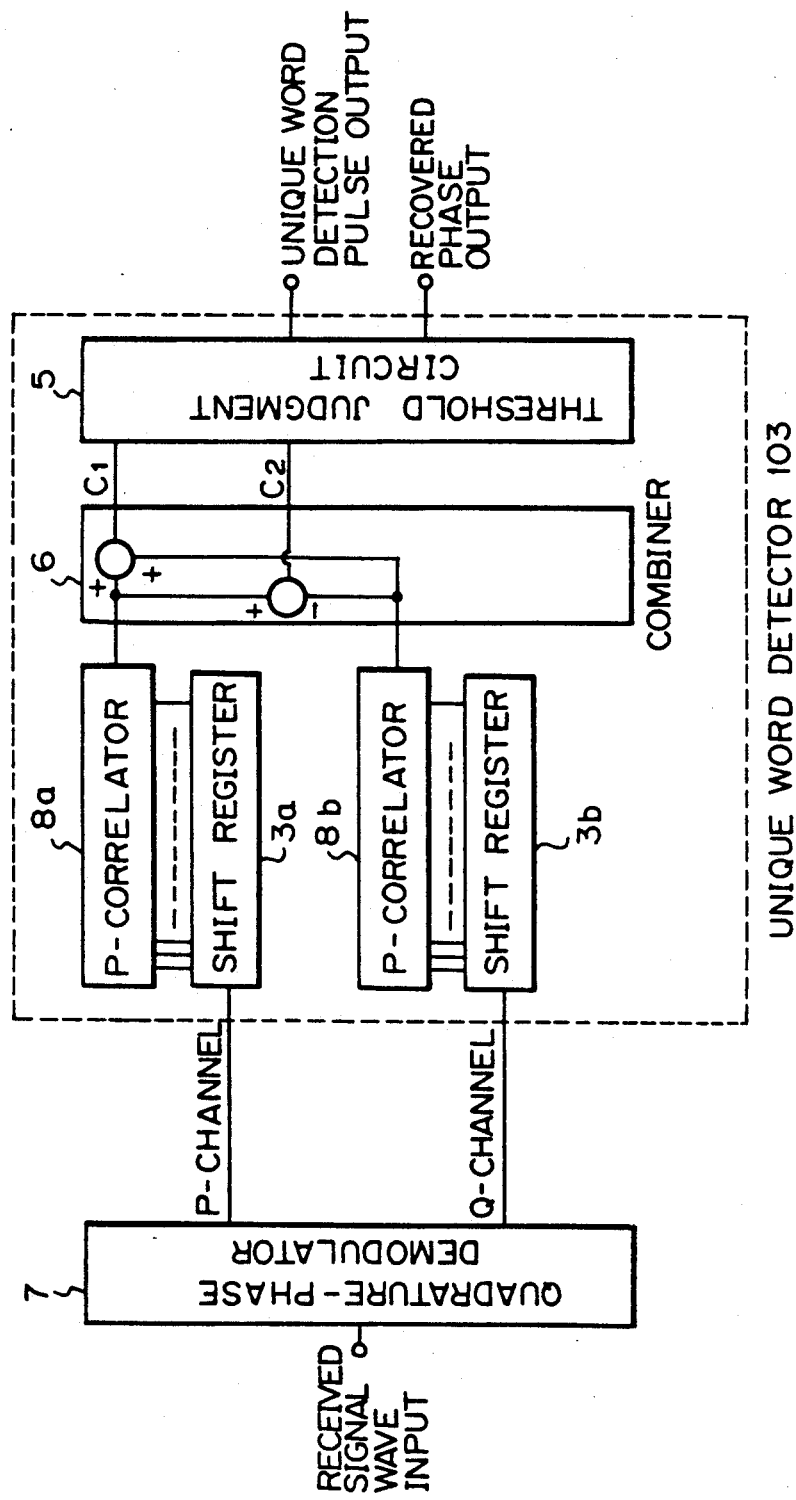

The reason why the judged result of twelve clock time before is referred to will be described below. In Figs. 4, (a)–(p), $C_1$ and $C_2$ for the sixteen unique word patterns when no error exists are shown. The names of the unique word patterns are shown on the left and upper portions of figures in FIGS. 4. Further, $C_1$ and $C_2$ are shown in upper and lower graphic charts, respectively. An abscissa represents a displacement (in clock time) and the displacement 0 represents the time point when the unique word is to be detected correctly. A computation is conducted while presuming that the unique word is followed by the P-channel data 010101111100 and the Q-channel data 010001101101. It is seen from FIGS. 4 that the absolute value of $C_1$ or $C_2$ reaches 24 at the displacement −12 and 0. When FIGS. 4, (a)–(p) are compared with one another, it is realized that the sixteen unique word patterns can be completely identified by recognizing which of $C_1$ and $C_2$ the absolute value of the correlation value reaches 24 at the displacement −12 and 0 and, whether a polarity is positive or negative. Table 2 shows above-described relationship. In other words, the sixteen unique word patterns are encoded into sixteen types at the displacement −12 and 0.

When the absolute value of $C_1$ or $C_2$ exceeds the threshold value at two clock time points whose displacement is different by twelve, the unique word and the received phase were judged in the conventional unique word detecting system. On the other hand, the unique word and the received phase are judged on the basis of the correlation patterns of both $C_1$ and $C_2$ at the two clock time points whose displacement is different by twelve in the present invention.

The correlation patterns of $C_1$ and $C_2$ are the same as in afore-mentioned Table 1 if the number of error bits contained in the partial 24 bits pattern of the unique word is 0–6..

As described above, the detection of the type of the unique word can also be performed in addition to the judgment of the received phase in the embodiment 2.

A comparison between the effect of the present invention and a prior art will be described below.

The miss detection probability and false detection probability when the correlation patterns except those in an undetectable region encircled by the broken lines in Table 1 are assigned are as follows:

The false detection probability is defined as the probability that the unique word is detected in error in an aperture with a width of 65 bits. A bit error rate is assumed to be $5 \times 10^{-3}$.

TABLE 2

| unique word pattern | displacement −12 ($C_1$, $C_2$) | displacement 0 ($C_1$, $C_2$) |
|---|---|---|
| $UW_0$, I   | (24, 0)   | (24, 0) |
| $UW_0$, II  | (0, 24)   | (0, 24) |
| $UW_0$, III | (−24, 0)  | (−24, 0) |
| $UW_0$, IV  | (0, −24)  | (0, −24) |
| $UW_1$, I   | (24, 0)   | (0, −24) |
| $UW_1$, II  | (0, 24)   | (24, 0) |
| $UW_1$, III | (−24, 0)  | (0, 24) |
| $UW_1$, IV  | (0, −24)  | (−24, 0) |
| $UW_2$, I   | (24, 0)   | (0, 24) |
| $UW_2$, II  | (0, 24)   | (−24, 0) |
| $UW_2$, III | (−24, 0)  | (0, −24) |
| $UW_2$, IV  | (0, −24)  | (24, 0) |
| $UW_3$, I   | (24, 0)   | (−24, 0) |
| $UW_3$, II  | (0, 24)   | (0, −24) |
| $UW_3$, III | (−24, 0)  | (24, 0) |
| $UW_3$, IV  | (0, −24)  | (0, 24) |

Miss Detection Probability

The miss detection probability takes the common value $1.03 \times 10^{-10}$ for the sixteen unique word patterns:

False Detection Probability

The false detection probability takes the following three kinds of values due to a difference in the forms of the correlation values $C_1$ and $C_2$ shown in FIGS. 4:

$2.0443 \times 10^{-10}$ ... $UW_0, I - UW_0, IV$ $5.2953 \times 10^{-11}$ ... $UW_1, I - UW_1, IV$ $UW_2, I - UW_2, IV$ $5.3005 \times 10^{-11}$ ... $UW_3, I - UW_3, IV$ Further, the miss detection probability and the false detection probability when the conventional unique word detecting system is employed are as follows: In this case, the threshold value is assumed to be 5.

Miss Detection Probability

The miss detection probability takes the common value $3.89 \times 10^{-9}$ for the sixteen unique patterns.

False Detection Probability $2.3717 \times 10^{-13}$ ... $UW_0, I - UW_0, IV$ $2.2804 \times 10^{-13}$ ... $UW_1, I - UW_1, IV$ $UW_2, I - UW_2, IV$ $2.2805 \times 10^{-13}$ ... $UW_3, I - UW_3, IV$ Thus, when the specified value for the miss detection probability and the false detection probability is $1 \times 10^{-8}$, the specification can be satisfied even by the conventional unique word detection system. However, when the specified value is $1 \times 10^{-9}$, the miss detection probability can no longer satisfy the specification by the conventional unique word detection system and the unique word with the longer sequence must be employed. The unique word detection system according to the present invention, however, sufficiently satisfies even the specified value of $1 \times 10^{-9}$.

It has become clear that all the correlation patterns except those in the encircled ones by the dotted lines in Table 1 makes an optimum case wherein the miss detection probability and the false detection probability are kept less than the specified value and the sum of both the probabilities are minimized. In this case, the sum of both the probabilities is reduced to less than one-tenth as compared with a conventional case and a communication quality becomes better to that extent. Thus, the present invention provides an optimum unique word detection.

While the quadrature-phase modulation is exemplified in the description above, it is a matter of course that the present invention can be similarly applied to the system employing other unique words or other systems adopting other multiphase/multilevel modulation systems, such as the eight-phase phase shift keying system, a sixteen-valued QAM system or a sixty-four-valued QAM system. While the embodiments employing the shift registers and the digital correlators to obtain the correlation values are described above, the employment of an analog correlator or the like has no objection.

As described above, since the unique word is detected on the basis of the correlation patterns in the present invention, the fine control can be effected for the miss detection probability and the false detection probability. Further, since the unique word including the errors in the number that has been unable to be detected in the conventional system can be detected in part, the miss detection probability can be reduced. As a result, even when the specified value is not satisfied to a slight degree and the unique word of the longer sequence must be employed in the conventional system, the specified value may be satisfied according to the present invention in many cases. Thus, the circuit scale of the unique word detector can be reduced and the transmission efficiency of the digital communication system can be improved.

Further, it is even possible thatthe sum of the miss detection and false detection probabilities are minimized while keeping both the probabilities less than the specified value to perform the optimum unique word detection according to the present invention, resulting in an improvement in the quality of the communication system.

Still further, by comparing the current unique word and the unique word of twelve clock time before with the predetermined correlation patterns, the presence or absence and the type of the unique word and the received phase in the demodulator can be detected at the same time.

Therefore, the unique word detection system according to the present invention are widely suitable for the digital communication system in general, such as the TDMA system, a TDM (Time Division Multiplex) system, a maritime, aeronautical satellite communication system and a subscriber radio system. The effect of the unique word detection system according to the present invention is large.

From the foregoing it will now be apparent that a new and improved unique word detection system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A unique word detection system comprising:
   a demodulator receiving a received signal;
   a plurality of correlation means for providing a plurality of correlation values between a plurality of output data, which are demodulated by said demodulator, and one or more than one predetermined patterns;
   a linear operation circuit performing a linear operation on said plurality of correlation values to provide a correlation pattern; and
   determining means for determining a unique word by comparing said correlation pattern with predetermined correlation patterns to recognize presence of a unique word in said received signal when said correlation pattern coincides with one of said predetermined correlation patterns.

2. A unique word detection system according to claim 12, wherein said determining means also determines a recovered phase in the demodulator by comparing said correlation pattern with said predetermined correlation patterns.

3. A unique word detection system according to claim 1, wherein said determining means is implemented by a read only memory table.

4. A unique word detection system according to claim 1, wherein said correlation pattern is one of (A,B), (B,A), (−A,−B), and (−B,−A).

5. A unique word detection system for a digital communication system wherein a plurality of first unique words, which form a second unique word, are employed comprising:
   a demodulator receiving a received signal;
   a plurality of correlation means for providing a plurality of correlation values between a plurality of output data, which are demodulated by said demodulator, and one or more than one predetermined patterns;
   a linear operation circuit performing a linear operation on said plurality of correlation values to provide a correlation pattern;
   first determining means for determining a first unique word by comparing said correlation pattern with predetermined correlation patterns to recognize presence of said first unique word in said received signal when said correlation pattern coincides with one of said predetermined correlation patterns; and
   second determining means for determining a second unique word, said second determining means coupled with an output of said first determining means to recognize presence of said second unique word in said received signal based on a plurality of previous and current outputs of said first determining means.

6. A unique word detection system according to claim 5, wherein said second determining means presence of a recovered phase in the demodulator based upon said plurality of previous and current outputs of said first determining means.

7. A unique word detection system according to claim 5, wherein said second determining means also determines type of the second unique word based upon said plurality of previous and current outputs of said first determining means.

8. A unique word detection system according to claim 5, wherein said second determining means also determines type of the second unique word and recovered phase in the demodulator based upon said plurality of previous and current outputs of said first determining means.

9. A unique word detection system according to claim 5, wherein at least one of said first and second determining means is implemented by a read only memory table.

10. A unique word detection system according to claim 3, wherein said correlation pattern is one of (A,B), (B,A), (−A,−B), and (−B,−A).

* * * * *